United States Patent [19]

Divine et al.

[11] Patent Number: 5,410,721
[45] Date of Patent: Apr. 25, 1995

[54] SYSTEM AND METHOD FOR INCREMENTING A PROGRAM COUNTER

[75] Inventors: James S. Divine; Charles F. Studor, both of Austin, Tex.

[73] Assignee: Motorola, Inc., Schaumburg, Ill.

[21] Appl. No.: 996,749

[22] Filed: Dec. 24, 1992

[51] Int. Cl.$^6$ .............................................. G06F 7/00
[52] U.S. Cl. ............................. 395/800; 364/DIG. 2; 364/770; 364/933.2; 364/937.1; 364/937.2
[58] Field of Search ...................... 395/800, 375, 550; 364/747, 768, 787, 770

[56] References Cited

U.S. PATENT DOCUMENTS

| | | | |
|---|---|---|---|
| 3,962,682 | 6/1976 | Bennett | 340/172.5 |
| 4,090,236 | 5/1978 | Bennett et al. | 364/200 |
| 4,245,327 | 1/1981 | Moriya et al. | 364/768 |
| 4,266,270 | 5/1981 | Daniels et al. | 395/800 |
| 4,300,195 | 11/1981 | Raghunathan et al. | 395/800 |
| 4,323,964 | 4/1982 | Gruner | 395/375 |
| 4,348,721 | 9/1982 | Brereton et al. | 395/200 |
| 5,051,885 | 9/1991 | Yates, Jr. et al. | 395/375 |
| 5,163,139 | 5/1992 | Haigh et al. | 395/375 |
| 5,255,382 | 10/1993 | Pawloski | 395/375 |

OTHER PUBLICATIONS

"Microprocessor, Microcontroller and Peripheral Data", vol. I, published by Motorola, Inc. in 1988, pp. 3-61 through 3-91.

*Primary Examiner*—Alyssa H. Bowler
*Assistant Examiner*—Mehmet Geckil
*Attorney, Agent, or Firm*—Elizabeth A. Apperley

[57] ABSTRACT

A data processor (10) increments a sixteen bit program counter value using an arithmetic logic unit, ALU, (224) and an eight bit incrementer(250). The ALU increments a low byte of the program counter value. A carry generated by incrementing the low byte is propagated to the incrementer. The incrementer then increments the high byte of the program counter value. Subsequently, the high and low bytes of the program counter value are respectively stored in a high and low program counter register (200, 206). Therefore, eight bits of an incrementer which would have typically been required to implement an incrementer for the low byte of the program counter value have been eliminated without a reduction in functionality of the data processor.

29 Claims, 5 Drawing Sheets

SYSTEM AND METHOD FOR INCREMENTING A PROGRAM COUNTER

CROSS REFERENCE TO RELATED APPLICATION

This application is related to our commonly assigned copending patent application entitled: "SYSTEM AND METHOD FOR EXECUTING A BRANCH INSTRUCTION" by James S. Divine and Charles F. Studor, U.S. patent application Ser. No. 07/996,769 and filed concurrently herewith.

FIELD OF THE INVENTION

This invention relates generally to a data processor, and more particularly to incrementing a program counter value in a data processor.

BACKGROUND OF THE INVENTION

While executing any sequence of software instructions, a data processor uses a program counter to indicate a program address of an instruction to be executed. The program counter is typically either incremented or decremented to provide a program address of a next instruction. While the program counter is necessary to operation of the data processor, the circuitry required to implement the counter often requires a significant amount of surface area in the execution unit of the data processor.

In most data processors, the program counter must be able to increment at least a sixteen bit number. Generally, the program counter is divided into a high byte and a low byte. The high byte of the program counter either increments or decrements a high byte of a program address value. Similarly, the low byte of the program counter either increments or decrements a low byte of the program address value. If a carry or borrow is generated by the modification of the low byte of the program address value, the carry is propagated to the high byte of the program counter to be respectively incremented or decremented in a final result. Once the final result is generated, each of the high and low bytes of the final result is respectively stored in either a high byte and a low byte register.

While sixteen bit program counters result in efficient execution of software instructions, the area required to implement a sixteen bit incrementer often prohibits the inclusion of additional desired features in data processors having a low cost architecture. Therefore, a need exists for a system or method for incrementing or decrementing a program counter value in a data processor which requires less circuit area than conventional implementations. The system or method should also modify the program counter value quickly and inexpensively.

SUMMARY OF THE INVENTION

The previously mentioned needs are fulfilled with the present invention. Accordingly, there is provided, in a first form, a system for modifying a program counter value in a data processing system. The system includes a control unit for generating a plurality of timing and instruction control signals during execution of a software instruction in the data processing system. The system also includes a program counter register for storing a current program counter value. The current program counter value identifies the software instruction being executed. An arithmetic logic unit is coupled to the program counter register for receiving a first portion of the current program counter value. The arithmetic logic unit is coupled to the control unit for receiving a first one of the plurality of timing and instruction control signals. The arithmetic logic unit modifies the first portion of the program counter value to provide a modified first portion of the program counter value in response to the first one of the plurality of timing and instruction control signals. The arithmetic logic unit provides the modified first portion of the program counter value to the program counter register to replace the first portion of the current program counter value. An incrementer is coupled to the program counter register for receiving a second portion of the current program counter value. The incrementer is coupled to the control unit for receiving a second one of the plurality of timing and instruction control signals. The incrementer modifies the second portion of the program counter value in response to the second one of the plurality of timing and instruction control signals to provide a modified second portion of the program counter value. The incrementer provides the modified second portion of the program counter value to the program counter register to replace the second portion of the current program counter value.

In a second embodiment of the invention, there is provided, a method for incrementing a program counter value in a data processing system. In a first step, the program counter value is stored in a program counter register. The program counter value has a first portion and a second portion. A software instruction which is identified by the program counter value is then received. The software instruction is decoded to provide a plurality of timing and instruction control signals. The first portion of the program counter value is transferred to an arithmetic logic unit. The first portion of the program counter value is modified in response to a first one of the plurality of timing and instruction control signals to provide a modified first portion of the program counter value. The modified first portion of the program counter value is stored in the program counter register to replace the first portion of the program counter value stored therein. The second portion of the program counter value is transferred to an incrementer. The second portion of the program counter value is modified in response to a second one of the plurality of timing and instruction control signals to provide a modified second portion of the program counter value. The modified second portion of the program counter value is stored in the program counter register to replace the second portion of the program counter value stored therein.

These and other features, and advantages, will be more clearly understood from the following detailed description taken in conjunction with the accompanying drawings. It is important to note the drawings are not intended to represent the only form of the invention.

DETAILED DESCRIPTION OF A PREFERRED EMBODIMENT

Figure 1:
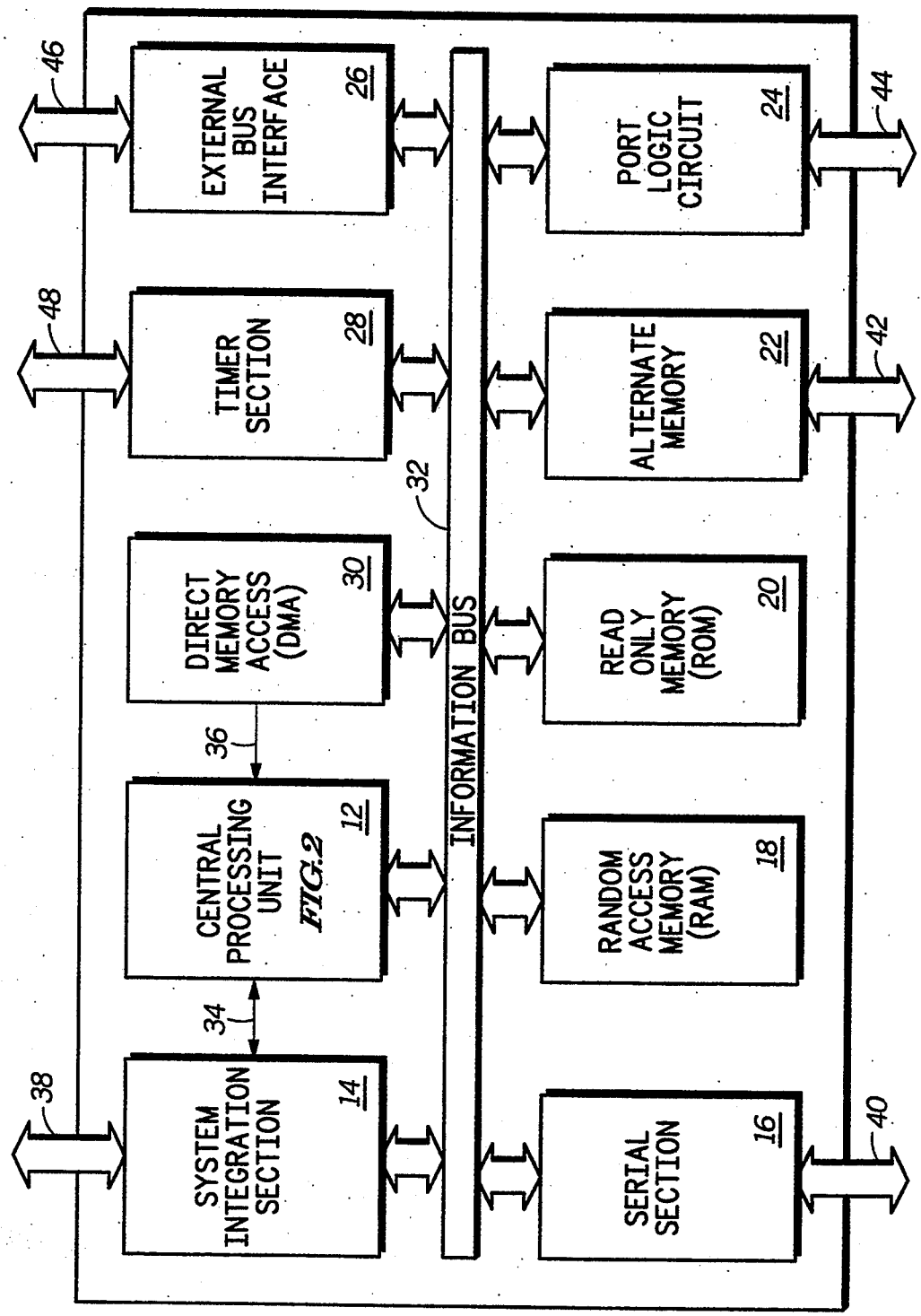
FIG. 1 illustrates in block diagram form a data processing system which either increments or decrements a program counter value in accordance, with the present invention.

The present invention provides a data processing system and a method for either incrementing or decrementing a program counter value. In the system and method described herein, a sixteen bit program counter value is incremented or decremented without requiring a sixteen bit incrementer. In this embodiment of the invention, only a single eight bit incrementer is required. Therefore, a second eight bit incrementer which has been required to implement program counters in prior art implementations is no longer necessary and a significant amount of circuit area is saved. The saved circuit area may then be used to add additional features to further enhance the data processing system. During discussion of the preferred embodiment of the invention, an example which explores incrementing or decrementing a sixteen bit program counter value is provided. It should be well understood, however, that a program counter value having a different number of bits may be provided to an appropriately modified data processing system to result in similar circuit area savings. Additionally, it should be understood that when an incrementer is used in this description of the invention, the incrementer may be interchanged with a decrementer. In the data processing art, it is commonly known that a circuit referred to as an incrementer may increment as well as decrement a value. Therefore, it should be understood that when an incrementer is referred to in the following description, the incrementer may both increment and decrement a value.

In the embodiment of the invention described herein, a sixteen bit program counter value is incremented using a single eight bit incrementer. The sixteen bit program counter value may be incremented using only a single eight bit incrementer because an arithmetic logic unit is used to increment a low byte of the program counter value. The arithmetic logic unit is typically used to perform arithmetic operations. However, in the embodiment of the invention described herein, the arithmetic logic unit executes two bus operation cycles to a single bus cycle of a data processing system in which this embodiment of the invention is implemented. Therefore, the arithmetic logic unit generally executes an arithmetic operation in one bus operation cycle and is not used in a second bus operation cycle. However, in the second bus operation cycle, the arithmetic logic unit may be used to increment the low byte of the program counter value. If a carry is generated by incrementing the low byte of the program counter, the carry is propagated to the eight bit incrementer. The incrementer then increments the high byte of the program counter value. Subsequently, the high and low bytes of the program counter value are respectively stored in a high and a low program counter register. As a result of this use of an arithmetic logic unit, eight bits of an incrementer which would have typically been required to implement a sixteen bit incrementer are eliminated without a reduction in functionality of the data processing system. Rather, more efficient use of each component of the data processing system allows for a significant circuit area savings.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

FIG. 1 illustrates one embodiment of a data processing system 10. Data processing system circuitry 10 generally includes a central processing unit (CPU) circuit 12, a system integration section of circuitry 14, a serial section of circuitry 16, random access memory (RAM) circuit 18, a read only memory (ROM) circuit 20, an alternate memory circuit 22 (e.g. electrically erasable programmable read only memory, EEPROM), a port logic circuit 24, an external bus interface circuit 26, a timer section of circuitry 28, and a direct memory access (DMA) circuit 30. Each of CPU 12, a system integration circuit 14, serial circuit 16, RAM 18, ROM 20, alternate memory circuit 22, port logic circuit 24, external bus interface circuit 26, timer circuit 28, and DMA 30 is bi-directionally coupled to an Information Bus 32. CPU 12 and system integration section 14 are bi-directionally coupled via a bus 34. Similarly, CPU 12 is coupled to DMA 30 via a bus 36.

System integration section 14 can receive and transmit signals external to data processing system 10 by way of a plurality of integrated circuit pins 38. The plurality of integrated circuit pins are not shown in detail herein. Serial section 16 can receive and transmit signals external to data processing system 10 by way of a plurality of integrated circuit pins 40. Again, the plurality of integrated circuit pins are not shown in detail herein. Depending upon the type of memory, alternate memory circuit 22 may optionally receive and transmit signals external to data processing system 10 by way of a plurality of integrated circuit pins 42 (not shown in detail herein). Port logic circuit 24 can also receive and transmit signals external to data processing system 10 by way of a plurality of integrated circuit pins 44. Additionally, external bus interface 26 can receive and transmit signals external to data processing system 10 by way of a plurality of integrated circuit pins 46. Timer section 28 can also receive and transmit signals external to data processing system 10 by way of a plurality of integrated circuit pins 48.

FIG. 1 illustrates one possible microcontroller within a family of microcontrollers. Because microcontrollers in the same family of data processors generally have a plurality of differing on-board peripherals, data processing system 10 provides only one embodiment of the invention described herein. For example, other embodiments of data processing system 10 may not have ROM 20, external bus interface 26, or DMA 30. In fact, other embodiments of data processing system 10 may have fewer, more, or different peripherals than those illustrated in FIG. 1. Additionally, in the embodiment of the invention illustrated in FIG. 1, data processing system 10 is an eight bit microcontroller which includes sixteen bit addresses and both eight and sixteen bit storage registers.

During operation of the embodiment of the invention illustrated in FIG. 1, system integration section 14 is used as a general controller for data processing system 10. Generally, system integration section 14 provides a plurality of control information to both enable and disable operation, to provide timing control, and to perform exception handling requirements for data processing system 10. System integration section 14 may interface directly with central processing unit 12 via bus 34, an external user via the plurality of integrated circuit pins 38, and with each of a remaining plurality of components of data processing system 10 via Information bus 32.

In data processing system 10, DMA 30 allows direct communication of data between memory internal to data processing system 10 and a plurality of peripheral devices (not shown). DMA 30 may be optionally implemented on data processing system 10 when a user requires a fast memory access method. Use and implementation of direct memory access circuits are well known in the data processing art and will not be discussed in further detail.

Timer section 28 executes a plurality of timing functions which are based on a free-running sixteen bit counter. When enabled through the plurality of integrated ,circuit pins 48, timer section 28 may function to perform an input-capture function, an output-compare functions, a real-time interrupt, or a computer operating properly watchdog function. Implementation and use of each of these functions is well known in the data processing art and will not be discussed in further detail.

External bus interface 26 controls receipt and transmission of address and data values between an external user or external peripheral device and data processing system 10. External bus interface 26 communicates a plurality of address and data values to a remaining portion of data processing system 10 via information bus 32.

Port logic circuit 24 controls operation and functionality of each one of the plurality of integrated circuit pins 44. Port logic circuit 24 configures the plurality of integrated circuit pins 44 to function either as general purpose input/output pins in a first mode of operation. In a second mode of operation, port logic circuit 24 may use each of the plurality of integrated circuit pins 44 to communicate multiplexed address and data information.

RAM 18, ROM 20, and alternate memory 22 function to store information necessary for the proper operation of data processing system 10. Additionally, other data and address values may be stored therein if specified in a user program.

Serial section 16 communicates serial digital data between data processing system 10 and an external user or an external peripheral device. The serial digital data and appropriate control signals are communicated via the plurality of integrated circuit pins 40.

Figure 2:
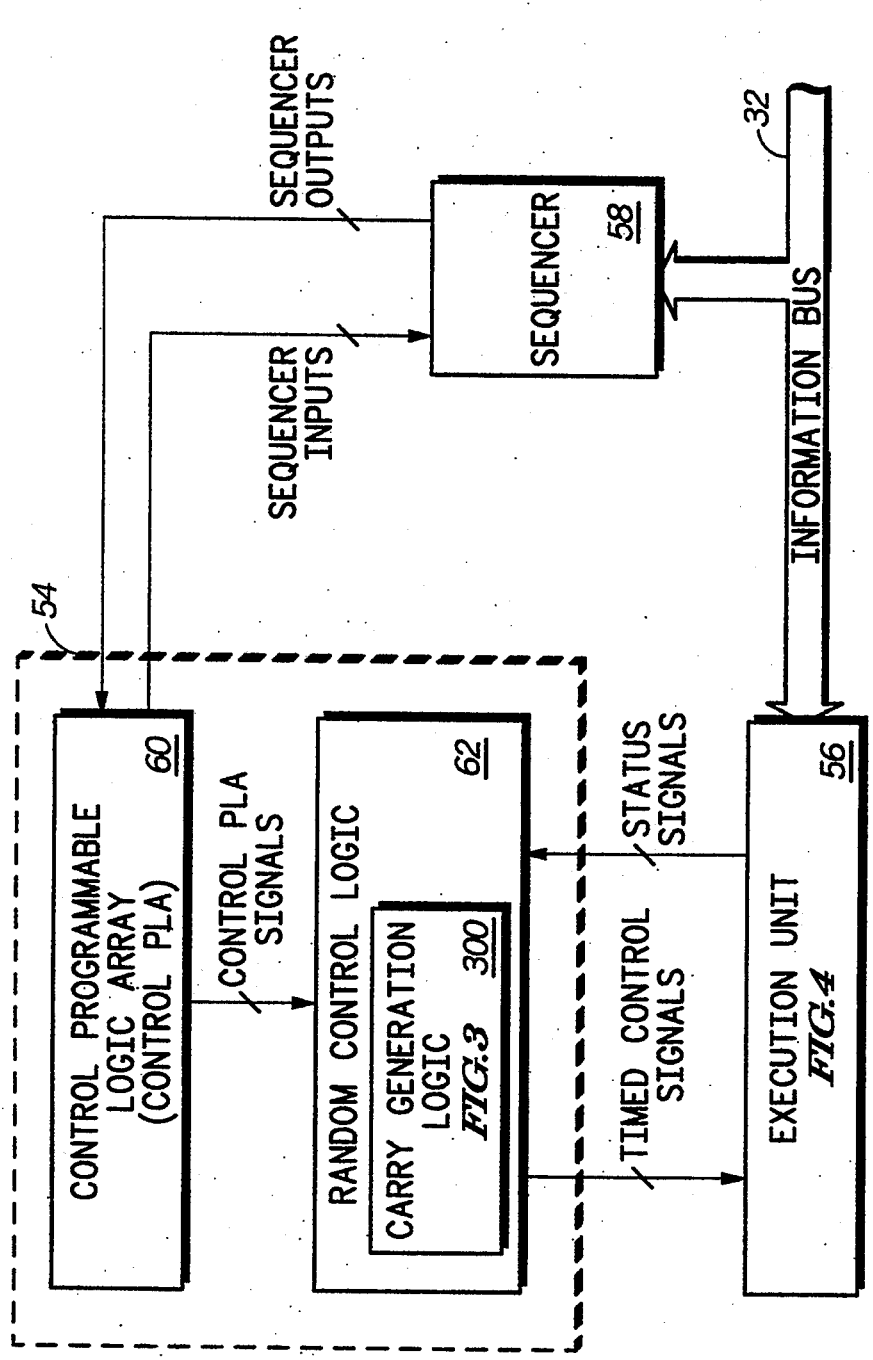
FIG. 2 illustrates in block diagram form a central processing unit of FIG. 1.

CPU 12 executes a plurality of instructions during operation of data processing system 10, Although many instructions may be executed in data processing system 10, the discussion herein will concentrate on incrementing the program counter. FIG. 2 illustrates CPU 12 in more detail. CPU 12 is basically divided into three major portions. The three major portions include a control unit 54, and execution unit 56, and a sequencer 58.

Control unit 54 includes a control programmable logic array (control PLA) circuit 60 and a random control logic circuit 62. In control unit 54, control PLA 60 is connected to random control logic circuit 62 to transfer a plurality of signals, collectively labeled Control PLA signals. Random control logic 62 includes a carry generation logic circuit 300 which will later tie discussed in further detail. Random control logic 62 is connected to execution unit 56 to both transfer a plurality of Timed Control signals and to receive a plurality of Status signals referred to as Status signals. Control PLA 60 is connected to sequencer 58 to both transfer a plurality of signals collectively labeled "Sequencer Input" and to receive a plurality of signals labeled "Sequencer Output." Both execution unit 56 and sequencer 58 are coupled to Information bus 32.

During operation of CPU 12, sequencer 58 receives instructions from Information bus 32. Sequencer 58 determines a state sequence of an instruction which is provided to control unit 54. The output of state sequencer 58 is provided to control PLA 60 of control unit 54 via the plurality of Sequencer Output signals. Upon receipt of the state sequence, control PLA 60 decodes the instruction to provide the plurality of Control PLA signals to random control logic 62. Control PLA 60 also provides the plurality of Sequencer Input signals to sequencer 58 to provide feedback about execution of the instruction. Random control logic 62 provides timing control to each of the plurality of Control PLA signals to provide the plurality of Timed Control signals to execution unit 56. Execution unit 56 performs each of the functions necessary to execute the instruction and subsequently provides the plurality of Status signals to random control logic 62 to indicate a state of CPU 12. In general, CPU 12 receives and decodes instructions to provide a plurality of control signals, executes the instruction in response to the plurality of control signals, and then provides feedback about execution of the instruction such that a new instruction may be received and executed.

Figure 3:
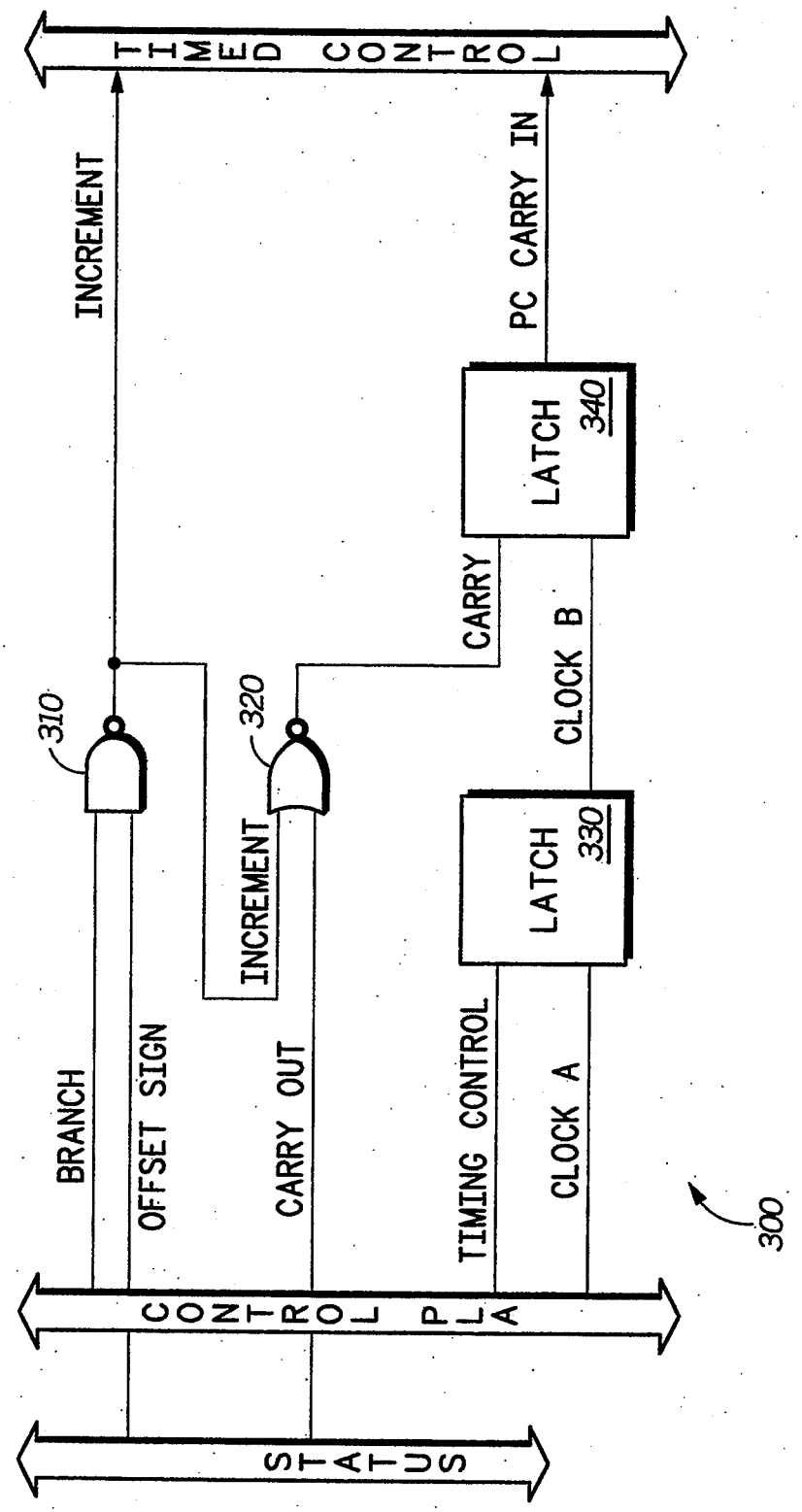
FIG. 3 illustrates in block diagram form a carry generation logic circuit of FIG. 2.

Carry generation logic circuit 300 is illustrated in greater detail in FIG. 3. Carry generation logic circuit 300 generally includes a NAND gate 310, an exclusive-NOR gate 320, a first latch 330, and a second latch 340. Control PLA 60 respectively provides a "Branch" signal to a first input of NAND gate 310 via the plurality of Control PLA signals. The plurality of Status signals provides an "Offset Sign" signal to a second input of NAND gate 310. An output of NAND gate 310 is labeled "Increment" and is provided to a first input of exclusive-NOR gate 320 and to execution unit 56 via the plurality of Timed Control signals. A second input of exclusive-NOR gate 320 is labeled "Carry Out" and is provided via the plurality of Status signals. An output of exclusive-NOR gate 320 is connected to a first input of latch 340 to provide a signal labeled "Carry." Control PLA 60 respectively provides a "Timing Control." signal and a "Clock A" signal to a first and a second input of latch 330 via the plurality of Control PLA signals. An output of latch 330 is connected to a second input of latch 340 to provide a signal labeled "Clock B." An output of latch 340 is labeled "PC Carry In" and is provided to execution unit 56 via the plurality of Timed Control signals. Operation of carry generation logic circuit 300 will be subsequently discussed in more detail.

Figure 4:
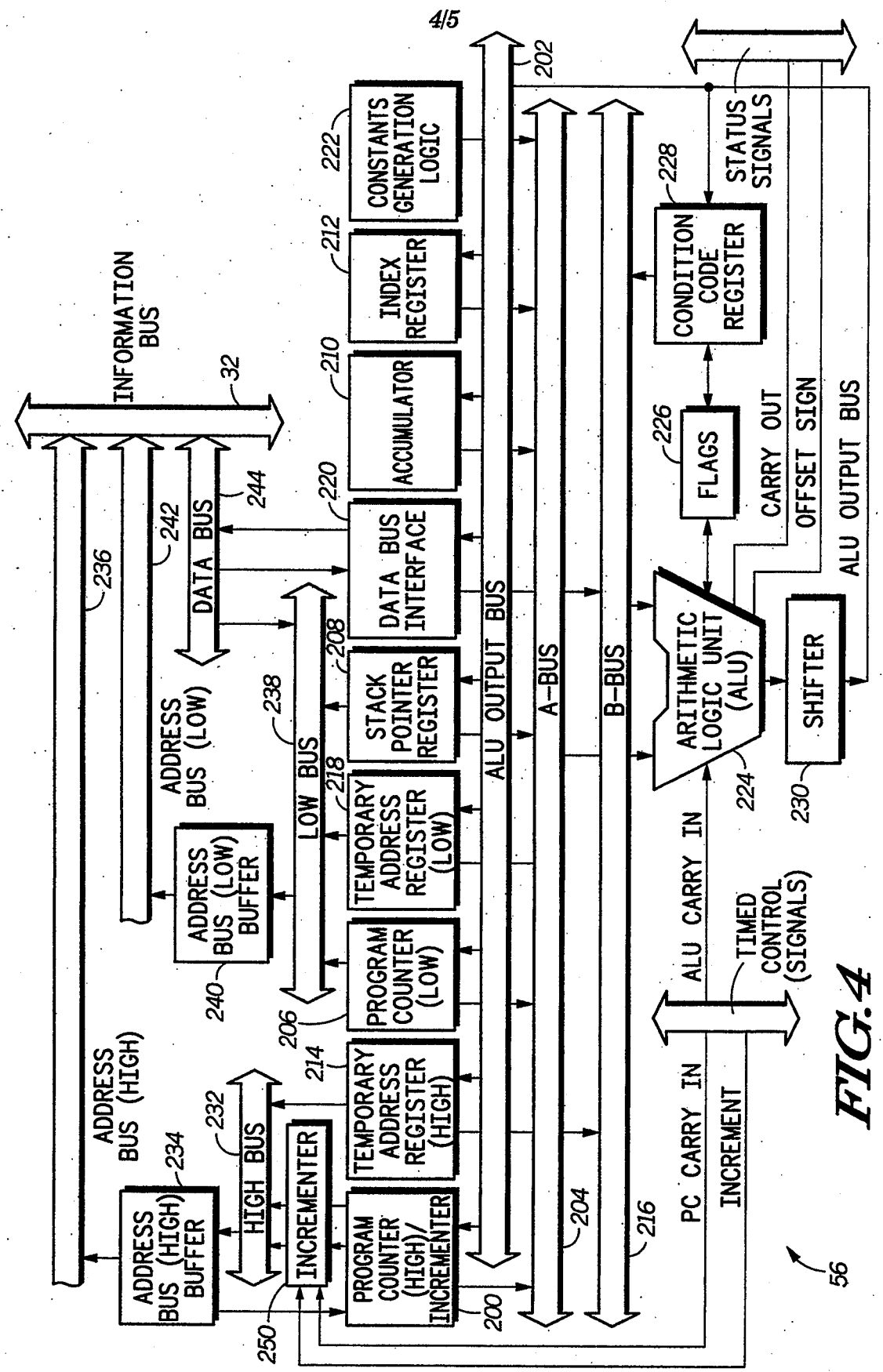
FIG. 4 illustrates in block diagram form a portion of an execution unit of FIG 2.

A portion of execution unit 56 is illustrated in greater detail in FIG. 4. Generally, the portion of execution unit 56 includes a program counter (high) register 200, a program counter (low) 206, a stack pointer register 208, an accumulator 210, an index register 212, a temporary address register (high) 214, a temporary address register (low) 218, a data bus interface 220, a constants generation logic circuit 222, an arithmetic logic unit (ALU) 224, a flags circuit 226, a condition code register 228, a shifter 230, an address bus (high) buffer 234, an address bus (low) buffer 240, and an incrementer 250. In this implementation of execution unit 56, FIG. 4 does not illustrate all circuitry which might be included in an execution unit. Rather, execution unit 56 includes the circuitry which is considered to be relevant to the embodiment of the invention described herein.

In execution unit 56, Information bus 32 communicates a plurality of data values to a Data bus 244. Information bus 32 also communicates a plurality of address values to an Address bus (high) 236 and an Address bus (low) 242. A high byte of an address value is provided to Address bus (high) 236 from address bus (high) buffer 234 and a low byte of an address value is provided to Address bus (low) 242 from address bus (low) buffer 240.

Data bus interface 220 is connected to Data bus 244 to both receive and transfer a plurality of data values. Data bus interface 220 is also connected to a B-Bus 216 to provide data values. Each of temporary address registers 214 and 218 are also connected to B-Bus 216 to provide address information. Similarly, each of program counter (high) 200, program counter (low) 206, stack pointer register 208, accumulator 210, index register 212, and constants generation logic 222 is connected to an A-Bus 204 to provide address, data, or control information.

ALU 224 is connected to both A-Bus 204, B-Bus 216, and the plurality of Timed Control signals. The plurality of Timed Control signals provide a signal labeled "ALU Carry In" to ALU 224. ALU 224 is also coupled to flags circuit 226. A first output of ALU 224 is labeled "Carry Out" and is provided to the plurality of Status signals. A second output of ALU 224 is connected to shifter 230. An output of shifter 230 is provided to an ALU Output bus 202. The ALU output bus 202 is connected to an input of each of condition code register 228, index register 212, accumulator 210, data bus interface 220, stack pointer register 208, temporary address register (low) 218, program counter (low) 206, temporary address register (high) 214, and program counter (high) 200.

Condition code register 228 is also coupled to B-Bus 216 and to flags circuit 226. Each of program counter (low) 206, temporary address register (low) 218, and stack pointer register 208 are provided to a Low bus 238. Data bus 244 is also connected to Low bus 238. Low bus 238 provides a plurality of data values to address bus (low) buffer 240. An output of address bus (low) buffer 240 is provided to an Address bus (low) 242.

Similarly, an output of program counter (high) is provided to incrementer 250. Additionally, the plurality of Timed Control signals provide both the Increment signal and the PC Carry In signal to incrementer 250. An output of incrementer 250, an output of program counter (high) 200, and an output of temporary address register (high) 214 are each provided to a High bus 232. High bus 232 provides a plurality of data values to address bus (high) buffer 234. A first output of address bus (high) buffer 234 is provided to an Address bus (high) 236. A second output of address bus (high) buffer is connected to program counter (high) 200. Each of Address bus (high) 236, Address bus (low) 242, and Data bus 244 are provided to Information bus 32.

During operation of data processing system 10, a program counter register (200, 206) stores an address of a software instruction to be executed. The address is used to access the software instruction which is subsequently provided to CPU 12. The software instruction is typically provided via a software program stored in either internal or external memory. Access of a software instruction through use of the program counter is well known in the data processing art and will not be discussed in further detail.

The instruction is first provided to sequencer 58 (of FIG. 2). At an appropriate point in time during execution of the software program, sequencer 58 provides the instruction to control PLA 60 to be decoded to provide the plurality of Control PLA signals. Random control logic 62 provides the correct timing for each of the plurality of Control PLA signals and transfers each as a corresponding one of the plurality of Timed Control signals to execution unit 56. Execution unit 56 then executes the software instruction in response to the plurality of Timed Control signals. Results of the execution of the software instruction are then provided to random control logic 62 via the plurality of Status signals and to a remaining portion of data processing system 10 via Information bus 32.

After access of the software instruction, the address of the software instruction must be incremented to provide an address of a next instruction to be executed. Execution unit 56 increments the program counter using a single incrementer 250 and ALU 224. During operation of execution unit 56, incrementer 250 functions as an eight bit incrementer which increments a high order byte of a program counter value. The high order byte of the program counter value is stored in program counter (high) register 200. Prior to determination of the high byte of the program counter value, ALU 224 concurrently increments a low order byte of the program counter value. The low byte of the program counter value is stored in program counter (low) register 206. After being incremented, each of the high and low order bytes of the program counter value is again respectively stored in program counter (high) register 200 and program counter (low) register 206.

To describe incrementing the program counter value in greater detail, assume that the high and low bytes of the program counter value have been previously stored in program counter (high) register 200 and program counter (low) register 206, respectively. At a point in time when the program counter value is to be incremented, the low byte of the program counter is transferred from program counter (low) register 206 to A-Bus 204. The low byte of the program counter is subsequently transferred to a first input of ALU 224. Concurrently, B-Bus 216 is pre-charged to a hexadecimal value of $FF. The value on B-Bus 216 is then inverted by an inversion circuit (not shown) to provide a hexadecimal value of $00 to a second input of ALU 224. The plurality of Timed Control signals provides the ALU Carry In signal to a third input of ALU 224 to increment the low byte of the program counter value. Random control logic circuit 62 asserts the ALU Carry In signal to effectively increment the low byte of program counter value by one.

ALU 224 adds each of the three values to generate a sum equal to the low byte of the program counter value plus one. If a carry is generated, the carry is output by ALU 224 via the Carry Out signal. The Carry Out signal is provided to carry generation logic 300 of random control logic circuit 62 via the plurality of Status signals. The sum generated by ALU 224 is provided to shifter 230. Shifter 230 then provides the sum to program counter (low) register 206 via ALU Output bus 202.

In carry generation logic 300, as illustrated in FIG. 3, the Carry Out signal is provided to exclusive-NOR gate 320. Additionally, control PLA 60 provides a plurality of Control PLA signals to carry generation logic circuit 300 in response to execution of the software instruction. Control PLA 60 provides the Branch signal to NAND gate 310 to indicate whether or not a branch operation occurs. The Branch signal is asserted to indicate that the software instruction being executed is a branch instruction. Similarly, the plurality of Status signals provides the Offset Sign signal to NAND gate 310 to indicate whether an offset of a branch instruction is positive or negative. If the offset of the branch instruction is positive, the Offset Sign signal is negated. If the offset of the branch instruction is negative, the Offset Sign signal is asserted. Typically, the program counter value is only decremented when a branch instruction with a negative offset is executed. Use of such instructions is well known in the data processing art and will not be discussed in further detail.

NAND gate 310 generates the; Increment signal. The Increment signal indicates whether the program counter value should be incremented or decremented. If the Increment value is asserted, the program counter value should be incremented. Similarly, if the Increment value is negated, the program counter value should be decremented. In summary, when the Increment signal is only negated when both the Branch signal and the Offset Sign signal are asserted.

Both the Increment signal and the Carry Out signal are provided to exclusive-NOR gate 320 to generate the Carry signal. If either one of, but not both of, the Carry Out signal or the Increment signal is asserted, the Carry signal is negated. The Carry signal is provided to latch 340 which is clocked by the Clock B signal. The Clock B signal is generated by latch 330 in response to both the Timing Control signal and the Clock A signal. Latch 340 provides the correct timing for the Carry signal and provides the timed PC Carry In signal. The PC Carry In signal is transferred via the plurality of Timed Control signals.

The function executed by carry generation logic circuit 300 determines both whether the high byte of the program counter value should be incremented or decremented and whether or not a carry should be provided to the high byte of the program counter value currently being incremented. Therefore, both the Increment signal and the PC Carry In signal are provided to execution unit 56 via the plurality of Timed Control signals.

In execution unit 56, the plurality of Timed Control signals provide both the Increment signal and the PC Carry In signal to incrementer 250. Program counter (high) register 200 provides the modified high byte of the program counter value to incrementer 250. The Increment signal enables incrementer 250 to either increment or decrement the high byte of the program counter value by a predetermined value. Additionally, when the PC Carry In signal is asserted, the high byte of the program counter value in program counter (high) register 200 is incremented by one to reflect that a carry was generated when the low byte of the program counter value was incremented by ALU 224.

Subsequently, incrementer 250 transfers the modified high byte of the program counter value to address bus (high) buffer 234 via High Bus 232. Similarly, program counter (low) register 206 provides the low byte of the program counter value stored therein to address bus (low) buffer 240 via Low bus 238. At an appropriate point in time, address bus (high) buffer 234 transfers the high byte of the program counter value to Address Bus (high) 236 and address bus (low) buffer 240 transfers the low byte of the program counter value to Address Bus (low) 242. Both Address bus (high) 236 and Address bus (low) 242 are coupled to Information Bus 32 to provide the program counter value to a remaining portion of CPU 12 and data processing system 10. In addition to transferring the high byte of the program counter value to Address bus (high) 236, address bus (high) buffer 234 transfers the modified high byte of the program counter value to program counter (high) register 200 to be stored.

Figure 5:
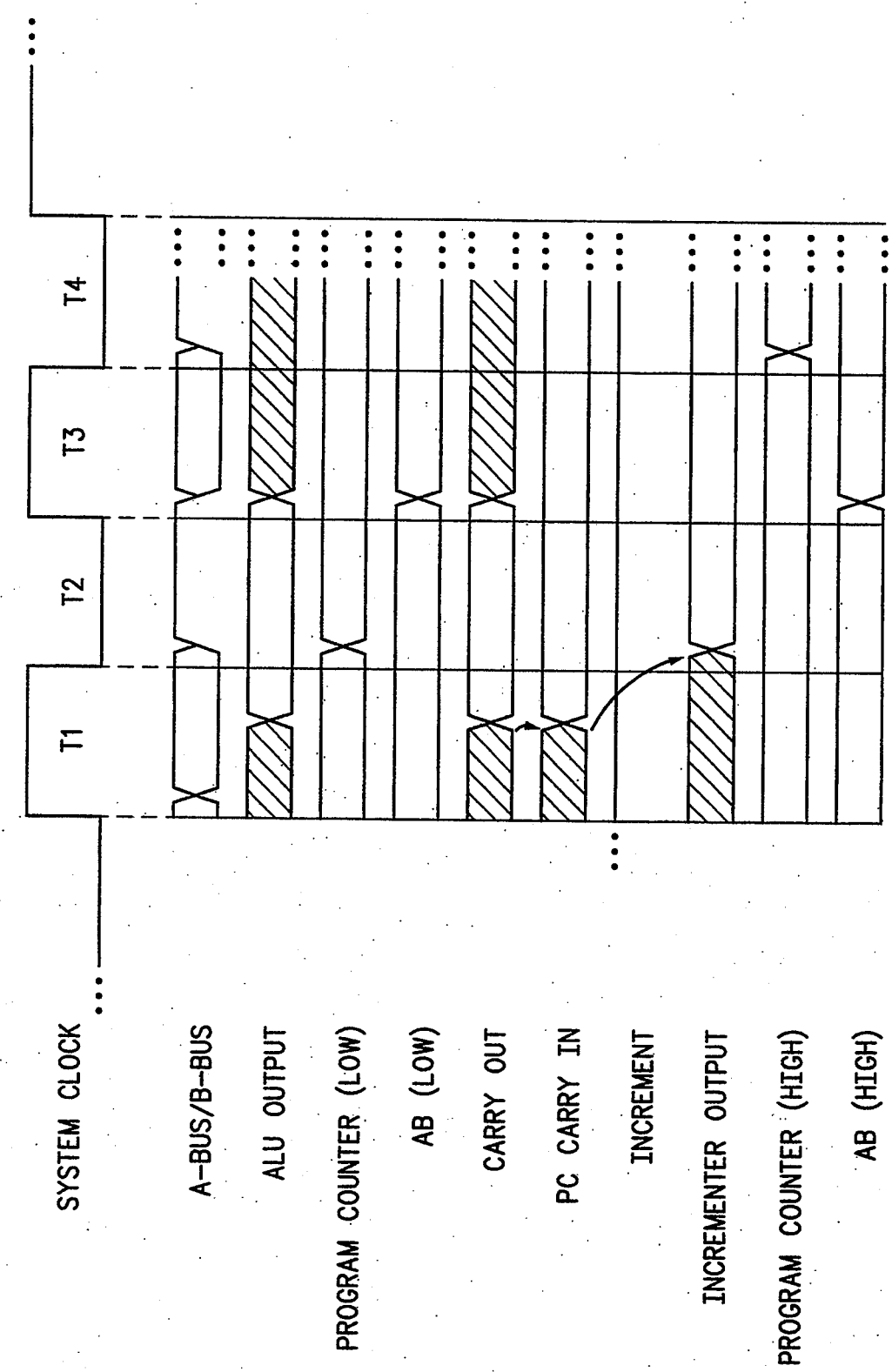
FIG. 5 illustrates in timing diagram form a plurality of steps for either incrementing or decrementing the program counter value in accordance with the present invention.

A timing diagram illustrating a program counter increment operation is illustrated in FIG. 5. A System Clock signal is a clock for execution unit 56 and is provided for reference. In this example, the System Clock signal is divided into four time pulses which are respectively labeled "T1", "T2", "T3", and "T4." During the first time pulse, T1, the low byte of the program counter value is provided to A-Bus 204. At some time before the T1 time pulse, B-Bus 216 is pre-charged to a hexadecimal value of $FF. In the T1 time pulse, B-Bus 216 is inverted to have a hexadecimal value of $00. The values on both A-Bus 204 and B-Bus 216 are valid until the second time pulse, T2. At the second time pulse, T2, A-Bus 204 and B-Bus 216 are precharged to a hexadecimal value of $FF. At the third time pulse, data is again transferred via A-Bus 204 and B-Bus 216 for an arithmetic function to be performed by ALU 224. At the beginning of the fourth time pulse, both A-Bus 204 and B-Bus 216 are again precharged to a hexadecimal value of $FF.

ALU 224 adds the contents of both A-Bus 204 and B-Bus 216 to provide a valid ALU Output later during the T1 time pulse. ALU 224 internally latches the values on A-Bus 204 and B-Bus 216 at the falling edge of the T1 time pulse. The ALU Output is valid until the beginning of the T3 time pulse. The ALU Output is provided to program counter (low) register 206 at the beginning of the T2 time pulse. Program counter (low) register 206 stores the ALU Output until the program counter (low) value is modified in a next program counter increment operation. The contents of program counter (low) register 206 are then transferred to address bus (low) buffer 240. The contents of address bus (low) buffer 240 are subsequently coupled to Address Bus (low) 242 at the beginning of the T3 time pulse.

When ALU 224 generates the ALU Output, the Carry Out signal is also generated. As with the ALU Output, the Carry Out signal is valid until the beginning of the T3 time pulse. Because a program counter increment operation is being performed, the Increment signal is valid during execution of the entire operation. During execution of an increment operation, the Increment signal is valid the entire time. If a branch operation is executed, the Increment signal might be negated. Generally, the Increment signal is only negated when a branch operation with a negative offset is executed.

As was previously explained, the Carry Out signal is used to generate the PC Carry In signal. The PC Carry In signal is valid after the Carry Out signal becomes valid in the T1 time pulse and remains valid through the T4 time pulse. Program counter (high) register 200 stores the program counter (high) value from the beginning of the T2 time pulse through the T4 time pulse. Program counter (high) register 200 also provides the program counter (high) value to incrementer 250.

Both the PC Carry In signal and the Increment signal may enable incrementer 250 to increment the high byte of the program counter value at an appropriate point in time after the high byte of the program counter value is valid. Incrementer 250 then transfers the modified high byte of the program counter value as the Incrementer Output to Address Bus (high) buffer 234 at the beginning of the T3 time pulse. Address Bus (high) buffer 234 subsequently drives the Increment Outputs signal to Address Bus (high) 236 at the beginning of the T3 time pulse. Address Bus (high) buffer 234 also provides the Increment Output signal of the program counter value to program counter (high) 200 to update the high byte of the program counter value stored therein.

As was previously mentioned, at the beginning of the T3 time pulse, ALU 224 is able to begin executing an arithmetic operation needed to perform a software instruction. In the embodiment of the invention described herein, ALU 224 is able to execute two operations for every one operation executed by a remaining portion of data processing system 10. Therefore, the arithmetic logic unit generally executes an arithmetic operation in one bus cycle and is not used for arithmetic operations in a second bus cycle. Typically, ALU 224 would have been idle before beginning to execute the arithmetic operation. However, by using the method and circuit described herein, ALU 224 is used more efficiently to both increment the low byte of the program value and perform needed arithmetic functions. No functionality is lost and an eight bit incrementer typically needed to increment the low order byte of the program counter value is eliminated from execution unit 56. In a low cost microprocessor, the circuitry required to implement the eight bit incrementer requires a significant amount of circuit area. Therefore, in the embodiment of the invention described herein, circuit area is saved and may be used to enhance features and functionality of data processing system 10.

In summary, in the embodiment of the invention described herein, an arithmetic logic unit (224) is used to increment the low byte of the program counter value. A carry generated by incrementing the low byte of the program counter is propagated to an incrementer. The incrementer then increments the high byte of the program counter value. Subsequently, the high and low bytes of the program counter value are respectively stored in a high and a low program counter register until each is propagated to an appropriate address bus. Therefore, eight bits of an incrementer which would have typically been required to implement an incrementer for the low byte of the program counter value have been eliminated without a reduction in functionality of the data processing system. Rather, more efficient use of each component of the data processing system allows for a circuit area savings.

The implementation of the invention described herein is provided by way of example only. However, many other implementations may exist for executing the function described herein. For example, incrementer 250 may both increment and decrement a program counter value. The Increment signal generated by carry generation logic 300 determines the function performed by incrementer 250. For example, the execution unit illustrated in FIG. 4 is one embodiment of a portion of an execution unit which may be implemented in the data processing system described herein. If a remaining portion of the execution were illustrated, other circuitry might be included. The circuitry might include a second index register for storing the high byte of the index pointer and a second stack pointer register for storing the high byte of the stack pointer. Additionally, the portion of execution unit 56 includes some commonly known logic circuits which are not used while modifying the program counter value. Therefore, depending on an application of the user of data processing system 10, part or all of these unused logic circuits may be eliminated from execution unit 56. As well, in carry generation logic circuit 300, each of latch 330 and latch 340 may be implemented as a standard latch circuit which is required to clock a signal. In another embodiment of the invention, each of the program counter (high) register 200 and program counter (low) register 206 may be implemented as a single program counter register. It should also be understood that while the embodiment of the invention described herein describes using an eight bit incrementer and an ALU to increment a sixteen bit data value, alternate embodiments in which thirty-two bit and sixty-four bit data values are incremented using sixteen bit and thirty-two bit incrementers, respectively.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A system for modifying a program counter value in a data processing system, comprising:

a control unit for generating a plurality of timing and instruction control signals during execution of a software instruction in the data processing system;

a program counter register for storing a current program counter value, the current program counter value identifying the software instruction being executed;

an arithmetic logic unit coupled to the program counter register for receiving a first portion of the current program counter value, the arithmetic logic unit coupled to the control unit for receiving a first one of the plurality of timing and instruction control signals, the arithmetic logic unit modifying the first portion of the program counter value to provide a modified first portion of the program counter value and a first carry signal in response to the first one of the plurality of timing and instruction control signals, the arithmetic logic unit providing the modified first portion of the program counter value to the program counter register to replace the first portion of the current program counter value; and an incrementer coupled to the program counter register for receiving a second portion of the current program counter value, the incrementer coupled to the control unit for receiving a second one of the plurality of timing and instruction control signals and a third one of the plurality of timing and instruction control signals, the incrementer modifying the second portion of the program counter value in response to the second one of the plurality of timing and instruction control signals and the third of the plurality of timing and instruction control signals to provide a modified second portion of the program counter value, the third one of the plurality of timing and instruction control signals transferring a carry value generated in response to the first carry signal provided by the arithmetic logic unit, the incrementer providing the modified second portion of the program counter value to the program counter register to replace the second portion of the current program counter value.

2. The system of claim 1 wherein the first one of the plurality of timing and instruction control signals enables the arithmetic logic unit to increment the first portion of the current program counter value by a predetermined value to provide the modified first portion of the program counter value.

3. The system of claim 2 wherein the predetermined value is equal to a value of one.

4. The system of claim 1 wherein the second one of the plurality of timing and instruction control signals enables the incrementer to increment the second portion of the program counter value by a predetermined value to provide the modified second portion of the program counter value.

5. The system of claim 4 wherein the predetermined value is equal to a value of one.

6. The system of claim 4 wherein the predetermined value is equal to a value of negative one.

7. The system of claim 1 wherein the first portion of the current program counter value is a low byte of the program counter value.

8. The system of claim 1 wherein the second portion of the current program counter value is a high byte of the program counter value.

9. The system of claim 1 wherein the program counter register further comprises:
a first register for storing the first portion of the program counter value; and
a second register for storing the second portion of the program counter value.

10. The system of claim 1 wherein the incrementer is coupled to the control unit or receiving a fourth one of the plurality of timing and instruction control signals, the incrementer either incrementing or decrementing the second portion of the program counter value in response to the fourth one of the plurality of timing and instruction control signal.

11. A method for incrementing a program counter value in a data processing system, comprising the data processor implemented steps of:
storing the program counter value in a program counter register, the program counter value having a first portion and a second portion;
receiving a software instruction identified by the program counter value;
decoding the software instruction to provide a plurality of timing and instruction control signals;
transferring the first portion of the program counter value to an arithmetic logic unit;
modifying the first portion of the program counter value in response to a first one of the plurality of timing and instruction control signals to provide a modified first portion of the program counter value and a carry signal;
storing the modified first portion of the program counter value in the program counter register to replace the first portion of the program counter value stored therein;
transferring the carry signal to a carry generation logic circuit, the carry generation logic circuit logically combining a second one of the plurality of timing and instruction control signals with the carry signal to generate a carry in signal;
transferring the second portion of the program counter value to an incrementer;
modifying the second portion of the program counter value in response to the second one of the plurality of timing and instruction control signals and the carry in signal to provide a modified second portion of the program counter value; and
storing the modified second portion of the program counter value in the program counter register to replace the second portion of the program counter value stored therein.

12. The method of claim 11 wherein the first one of the plurality of timing and instruction control signals enables the arithmetic logic unit to increment the first portion of the current program counter value by a predetermined value to provide the modified first portion of the program counter value.

13. The method of claim 12 wherein the predetermined value is equal to a value of one.

14. The method of claim 11 wherein the second one of the plurality of timing and instruction control signals enables the incrementer to increment the second portion of the program counter value by a predetermined value to provide the modified second portion of the program counter value.

15. The method of claim 14 wherein the predetermined value is equal to a value of one.

16. The method of claim 14 wherein the predetermined value is equal to a value of negative one.

17. The method of claim 11 wherein the first portion of the current program counter value is a low byte of the program counter value.

18. The method of claim 11 wherein the second portion of the current program counter value is a high byte of the program counter value.

19. The method of claim 11 wherein the program counter register further comprises:
a first register for storing the first portion of the program counter value; and
a second register for storing the second portion of the program counter value.

20. The method of claim 11 wherein the step of modifying the second program counter value is performed concurrently with the step of storing the modified portion of the program counter.

21. A system for modifying a program counter value in a data processing system, comprising:
a control unit for generating a plurality of timing and instruction control signals during execution of a software instruction in the data processing system;
a high program counter register for storing a high byte of a current program counter value, the current program counter value identifying the software instruction being executed;
a low program counter register for storing a low byte of the current program counter value;
an arithmetic logic unit coupled to the low program counter register for receiving the low byte of the current program counter value, the arithmetic logic unit coupled to the control unit for receiving a first one of the plurality of timing and instruction control signals, the arithmetic logic unit modifying the low byte of the program counter value to provide a modified low byte of the program counter value and a carry out signal in response to the first one of the plurality of timing and instruction control signals, the arithmetic logic unit providing the modified low byte of the program counter value to the low program counter register to replace the low byte of the current program counter value; and an incrementer coupled to the high program counter register for receiving the high byte of the current program counter value, the incrementer coupled to the control unit for receiving a second one of the plurality of timing and instruction control signals and carry in signal, the carry in signal generated in response to the second one of the plurality of timing and control signals and the carry out signal, the incrementer modifying the high byte of the program counter value in response to the second one of the plurality of timing and instruction control signals and the carry in signal provide a modified high byte of the program counter value, the incrementer providing the modified high byte of the program counter value to the high program counter register to replace the high byte of the current program counter value.

22. The system of claim 21 wherein the first one of the plurality of timing and instruction control signals enables the arithmetic logic unit to increment the first portion of the current program counter value by a predetermined value to provide the modified first portion of the program counter value.

23. The system of claim 22 wherein the predetermined value is equal to a value of one.

24. The system of claim 21 wherein the second one of the plurality of timing and instruction control signals enables the incrementer to increment the second portion of the program counter value by a predetermined value to provide the modified second portion of the program counter value.

25. The system of claim 24 wherein the predetermined value is equal to a value of one.

26. The system of claim 24 wherein the predetermined value is equal to a value of negative one.

27. The system of claim 21 wherein the arithmetic logic unit outputs the carry out signal to indicate if a carry value is generated when the first portion of the program counter value is modified by the arithmetic logic unit.

28. The system of claim 21 wherein the incrementer is coupled to the control unit for receiving a third one of the plurality of timing and instruction control signals, the incrementer either incrementing or decrementing the second portion of the program counter value in response to the third one of the plurality of timing and instruction control signals.

29. The system of claim 21 wherein the control unit comprises:

a carry generation logic circuit for generating the second one of the plurality of timing and instruction control signals and the carry in signal.

* * * * *

UNITED STATES PATENT AND TRADEMARK OFFICE
CERTIFICATE OF CORRECTION

PATENT NO. : 5,410,721
DATED : April 25, 1995
INVENTOR(S) : James S. Divine et al.

It is certified that error appears in the above-indentified patent and that said Letters Patent is hereby corrected as shown below:

Column 13, line 1, after "third" insert --one--.

Signed and Sealed this

Twenty-eighth Day of November 1995

Attest:

BRUCE LEHMAN

Attesting Officer     Commissioner of Patents and Trademarks